United States Patent [19]

Verheyen et al.

[11] 3,932,726
[45] Jan. 13, 1976

[54] GLASS CUTTING

[75] Inventors: Willy Verheyen, Mol, Belgium;
André Raes, Tiel, Netherlands;
Jean-Paul Coopmans, Bierbeek;
Jean-Louis Lambert,
Chaumont-Gistoux, both of Belgium

[73] Assignee: Glaverbel-Mecaniver S.A.,
Watermael-Boitsfort, Belgium

[22] Filed: Oct. 11, 1973

[21] Appl. No.: 405,598

[30] Foreign Application Priority Data
Oct. 12, 1972 Luxemburg.............................. 66278

[52] U.S. Cl............. 219/121 LM; 65/113; 225/93.5
[51] Int. Cl.²......................................... C03B 33/00
[58] Field of Search................... 65/176, 112, 113;
225/93.5, 96.5; 219/121 L, 121 LM

[56] References Cited
UNITED STATES PATENTS

| | | | |
|---|---|---|---|
| 2,584,851 | 2/1952 | Dunipace | 65/112 X |
| 3,344,968 | 10/1967 | Kovacik et al. | 65/112 X |
| 3,453,097 | 7/1969 | Häfner | 219/121 LM |
| 3,474,944 | 10/1969 | Chatelain et al. | 65/112 |
| 3,543,979 | 12/1970 | Grove | 219/121 L X |
| 3,589,883 | 6/1971 | Dear | 219/121 LM X |
| 3,756,482 | 9/1973 | DeTorre | 65/113 |
| 3,760,997 | 9/1973 | Bier | 225/96.5 |
| 3,795,572 | 3/1974 | DeTorre | 65/112 |
| 3,800,991 | 4/1974 | Grove et al. | 225/93.5 |

Primary Examiner—J. V. Truhe
Assistant Examiner—Clifford C. Shaw
Attorney, Agent, or Firm—Spencer & Kaye

[57] ABSTRACT

In the severing of glass by irradiating it with a laser beam along the line where it is to be severed, the quality and speed of the severing operation are improved by preliminarily scoring the glass along such line.

5 Claims, 3 Drawing Figures

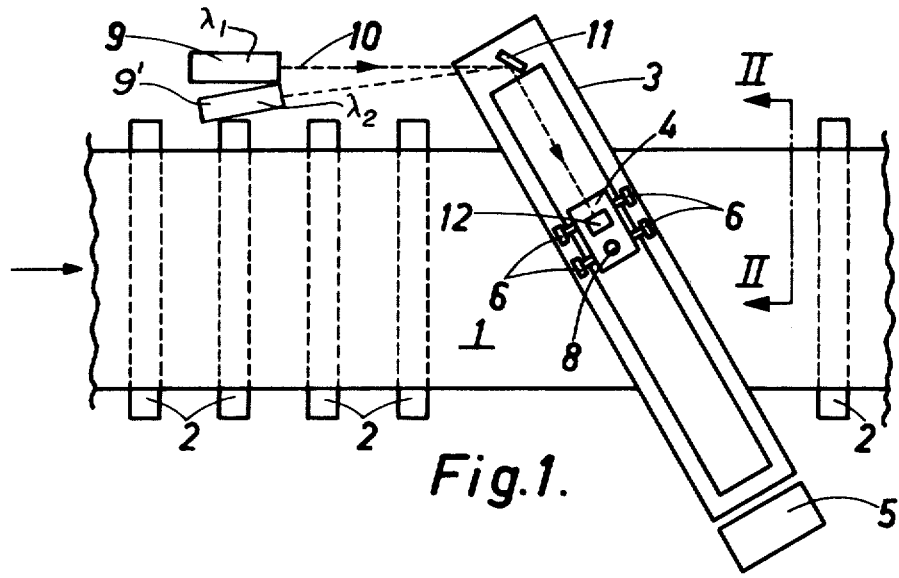
Fig.1.
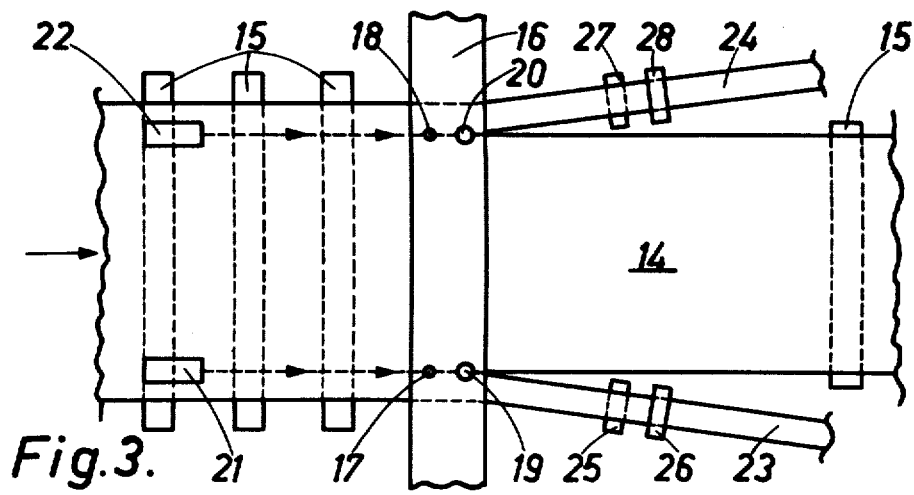
Fig.2.
Fig.3.

GLASS CUTTING

BACKGROUND OF THE INVENTION

The present invention relates to a method of severing vitreous or vitrocrystalline sheet material along predetermined lines, particularly by applying severing forces of thermal origin to the sheet material by irradiating it with at least one laser beam. The invention also relates to an apparatus for the performance of the method.

The term "vitrocrystalline material" used herein denotes material formed by thermally treating glass to cause the formation of one or more crystalline phases therein.

It is known that vitreous sheet material can be severed by irradiating the material with a laser beam. Thus United Kingdom Pat. specification No. 1,246,481 describes a method of severing vitreous sheet material by irradiating the material with a $CO_2$ laser. Such a laser is selected because it has a wavelength such that its energy is very strongly absorbed by the vitreous material. In consequence of this energy absorption, thermomechanical stresses are created in the sheet material which cause it to fracture.

This known method is applicable only to a limited range of sheet material thicknesses. In particular, the method is not reliably applicable for severing vitreous sheets above 5 mm in thickness. Moreover in the practice of the known method the sheet material sometimes fractures along lines which depart from the line traced by the laser beam.

SUMMARY OF THE INVENTION

It is an object of the present invention to provide a method which can be applied for severing vitreous and vitrocrystalline sheet material of a much wider range of thicknesses.

Another object of the invention is to provide a method by which such sheet materials can be cut with the rapidity which is required in flat glass manufacturing plants for cutting continuously manufactured ribbons of glass in order to remove the thicker ribbon margins.

According to the present invention, there is provided, in a method of severing vitreous or vitrocrystalline sheet material along a predetermined line, in which method severing forces of thermal origin are induced in the sheet material by irradiating it with at least one laser beam, the improvement that the irradiation of the material is preceded by scoring of the sheet along said line.

The present invention affords the very important advantage that it can be used for severing vitreous and vitrocrystalline sheets with a wide range of thicknesses extending both below and above 5 mm. The invention can in fact be used for severing thick sheets, e.g., sheets having a thickness of 10 mm or more.

Another advantage of the method is that the line along which the material is actually severed is strictly determined by the score line even if the path traced by the laser beam departs slightly from such score line. The course of the score line can of course be easily and accurately controlled.

Yet another very important advantage of the method according to the invention is that the severing operation is insensitive, or at least less sensitive, to pre-existing mechanical stresses in the sheet material. More particularly, if the intended line of severance, along which the material is scored, crosses a fault in the material, the fault at most entails a local imperfection in the separated edges of the material and does not cause fracturing stresses to be randomly propagated away from the intended line of severance. The fracture follows the score line, if not through the fault, then at least up to the boundary or boundaries of the fault intersected by such line.

It has also been found that the method according to the invention often enables severance of a given vitreous or vitrocrystalline material to be achieved with a laser beam of lesser energy than would be required when using the previously known method of laser beam cutting.

One of the present requirements in glass manufacture is that vitreous sheet material not only be severed very rapidly, as is necessary for example in order to continuously remove the excessively thick margins of a glass ribbon as it is produced in a high speed drawing machine, but that it also presents severed edges which are free from chipping and other irregularities.

The known method of severing vitreous sheet material by relying on the stresses of thermal origin induced by a highly absorbed laser beam can be used for severing fairly thin sheets, e.g. sheet material of 3 – 4 mm in thickness, but it is often found that the severed edges are impaired by defects which are quite evident to the naked eye and preclude the sheets from high quality grading in the absence of some further treatment such as grinding or fire polishing.

It has been found that the method according to the invention as hereinbefore defined enables such defects in the severed edges to be avoided, provided one very simple but important precaution is taken. This precaution relates to the manner in which the scoring of the sheet material is effected.

It is of course well known that vitreous sheet material can be severed by scoring the material and then subjecting it to externally applied mechanical forces in order to break the sheet material along the score line. This is in fact the traditional method of cutting glass and is employed manually and in automatic mass production and processing plants. While the usual techniques and conditions of operation of a scoring tool can be used when performing the scoring step of a method according to the invention, it has been found that a very marked improvement in the results, as far as the quality of the severed edges is concerned, can be realized if the scoring is effected with a substantially lower scoring tool pressure than that conventionally employed. It is surprising that such an improvement should ensue as a result of using an abnormally low tool force but in fact the combination of such a low tool force and the irradiation of the material with a laser produces very remarkable results. The methode utilizing such combination enables vitreous or vitrocrystalline sheet materials to be severed quickly and reliably and the severed edges are quite free from the usual easily detectable irregularities. The method gives these advantages when applied for severing thin sheets e.g. sheets of the order of 3 – 4 mm in thickness, and when applied for severing thick sheets e.g. sheets up to 10 mm or more in thickness.

Accordingly, in the embodiments of the invention to which particular importance is attached, the scoring is performed with a scoring tool force of such low magnitude that the resulting severed sheet edges are free from perceptible irregularities.

Preferably, the scoring tool force is less than 1 kg. This preferred maximum force is very much below the force which are conventionally employed and which have always hitherto been considered to be necessary for scoring glass preparatory to breakage. By keeping the scoring tool force below 1 kg when performing the scoring step in a method according to the invention, it can be assured that the severed edges have a very high quality.

The surprising nature of the discovery which has been made pertaining to the low tool force is highlighted by the fact that the method will give defect-free severed edges even when the scoring tool force is so low that the scored sheet material will not break accurately along the scored line when subjected to bending forces externally applied across the scored line. The invention in fact includes embodiments in which the scoring tool force is of such low magnitude that the scored sheet will pass that negative test.

The scoring tool used in a method according to the invention may be of any known type, e.g. a diamond or tungsten carbide tool.

Preferably, after the scoring, severance of the scored sheet material is brought about solely by forces induced by the action of the laser beam or beams. However the invention does not exclude methods in which some mechanical force is imposed on the material to assist division of the material along the scored line.

Two or more identical laser beams may be used for irradiating the sheet material along different sections of the length of a given score line. The sheet material can thus be severed more rapidly.

Preferably the thermal stresses causing severance are induced by two or more laser beams of different wavelengths such that the material to be severed has different degrees of transparency to the different beams. This feature promotes a more favorable energy stress distribution through the thickness of the material and enables true, chip-free, separated edges to be even more easily obtained. Moreover, the power of the individual lasers can be relatively low.

The two laser beams of different wavelengths may be directed so that at any given moment they simultaneously irradiate the same spot on the sheet material. However it is also possible for the different beams to irradiate adjacent spots. By using two or more laser beams of different wavelengths, the method can be made less sensitive to variations in the thickness of a sheet material along the line of severance.

In preferred embodiments of the invention, a relative movement is produced between a laser beam or beams and the sheet material to cause the material to be progressively irradiated by such beam or beams along the line of severance. In this way, it is possible to bring about severance along a scored line of any length by means of a beam or beams which irradiate one spot of the material at a time. A nicely controlled progressive separation of the sheet material along the score line can be brought about. The laser beam or beams is or are preferably uninterrupted so that the sheet material is irradiated at every location along the score line. The intensity of the or each laser beam is preferably selected so that it is at or about the lowest value which will be effective at the selected speed of the relative movement. In that case unnecessarily high energy concentrations at or near the surface of the sheet material are avoided, which, as already referred to, is a factor of importance for the quality of the separated edges.

Preferably the sheet material is simultaneously traversed along the line of severance, by a tool which scores the material, and by the laser beam or beams. In other words, the sheet is irradiated along the line of severance while the material is still being scored. Such embodiments of the method are advantageous from the point of view of time saving. Moreover, it is usually easier, when proceeding in that way, to ensure that the line traced out on the sheet material by the laser beam or beams strictly coincides with the line traced by the scoring tool.

The invention includes methods in which the vitreous or vitrocrystalline sheet material is in continuous movement during the scoring and the laser beam irradiation thereof. Generally speaking it is more convenient and satisfactory to displace the sheet material continuously during such scoring and irradiation. When cutting the sheet material along lines parallel to its direction of movement, the scoring tool and the laser beam or beams can be stationary. In any event, however, whatever be the orientation of the line or lines of severance in relation to the direction of movement of the sheet material, it is very convenient to sever the sheet material while it is in continuous movement. The material may, for example, be severed while travelling along part of a production or treatment line. Sheet glass can, for example, be severed while being continuously conveyed from an annealing lehr.

The invention is of particular importance as applied to the severance of a continuous glass ribbon. Thus, the invention can be employed for severing a continuous glass ribbon, at the outlet of an annealing lehr, into predetermined lengths and/or for severing such ribbon along its edges.

The invention includes apparatus for severing vitreous or vitrocrystalline sheet material by a method according to the invention as hereinbefore defined. Thus the invention provides an apparatus suitable for use in severing vitreous or vitrocrystalline sheet material, composed of means for supporting the sheet material, means for emitting a laser beam for inducing severing forces of thermal origin in the sheet material, and means for bringing about relative displacement between the laser beam and the sheet material to cause the beam to trace along a required line of severance, and characterized in that the apparatus also includes a tool for scoring the sheet material along the line of severance in advance of the irradiation of the material along that line by the laser beam.

Apparatus according to the invention enables glass and vitrocrystalline material in sheet form and of a wide range of thicknesses to be severed along a predetermined line. The apparatus can moreover achieve this result notwithstanding the pre-existance of random stresses in the material being severed. A laser beam of lower power than that required in the previously known laser beam cutting apparatus can often be used.

Preferably the scoring tool is under a loading of less than 1 kg. This feature helps to ensure that the severed sheet edges will be of good quality.

Such loading is preferably imposed by a weight bearing on the scoring tool. In that way it is possible to allow for variations in the thickness of the sheet material being severed. A better control of the loading is thus obtained.

In certain embodiments of apparatus according to the invention the apparatus includes laser beam directing means having at least one component which is displaceable to cause such beam to traverse the sheet material along the line of severance, the directing means being mounted on a moveable carrier for the scoring tool. This is a very convenient arrangement for causing the sheet material to be simultaneously traversed by the scoring tool and the laser beam or beams. Controlled progression of the fracture of the material along the score line can be brought about whether this material be stationary or in a state of movement and, in the latter case, regardless of the relationship between the direction of such movement and the direction of displacement of the point of impingement of the laser beam on the sheet material.

The invention includes apparatus wherein there is laser beam directing means composed of at least one optical device disposed between the laser beam source and the sheet material. By making use of this feature there is the possibility of choosing the most convenient location of the laser beam source, out of line with the direction of the laser beam when it impinges on the sheet material. The laser beam source may be mounted in a fixed position and the or at least one optical device between the source and the sheet material may be displaced to cause the beam to trace the required course along such material.

In a particularly advantageous form of apparatus according to the invention, a scoring tool carrier is mounted on an arm which is disposed so as to extend across, and to be spaced from, a surface of the sheet material when such material is on the sheet material supporting means, and the laser beam directing means includes a laser beam reflector mounted on such arm. Such apparatus is particularly well suited for use in the continuous automatic severance of a glass ribbon leaving an annealing lehr, for example a glass ribbon which has been formed by drawing from a bath of molten glass or by flotation of glass on a liquid bath.

BRIEF DESCRIPTION OF THE DRAWINGS

FIG. 1 is a plan view of one embodiment of the invention.

FIG. 2 is a cross-sectional view taken along line II—II of FIG. 1.

FIG. 3 is a plan view of another embodiment of the invention.

DESCRIPTION OF THE PREFERRED EMBODIMENTS

Referring to FIGS. 1 and 2, a glass ribbon 1, coming from a horizontal annealing lehr (not shown) of a known type, is supported on a roller conveyor 2, only a few rollers of which are shown in order to simplify the drawings. Above the path along which the glass ribbon is conveyed by the rollers there is an arm 3 along which a carriage 4 for a scoring tool travels, e.g., under power transmitted from a motor 5 via a chain transmission mechanism (not shown). The carriage 4 is stably supported on rollers 6 which engage in grooves 7 in the arm 3, as shown in FIG. 2. A scoring tool 8 is mounted on the carriage 4 and may, for example, incorporate a tungsten carbide wheel.

A laser beam source 9 is mounted at one side of the apparatus, such source being, for example, secured to a main frame of the apparatus. The laser is, for instance, a $CO_2$ type laser emitting radiation with a wavelength of 10.6 microns which is partly absorbed by the glass. The beam of coherent light 10 emitted from the laser source 9 is incident on a reflecting device 11 mounted on the arm 3 and is reflected thereby along a path parallel to the longitudinal axis of that arm onto a second reflector 12 which is attached to the scoring tool carriage 4. The reflector 12 reflects the beam 10 onto the glass ribbon via an optical lens 13 which focuses the beam on the line which has just been scored by the tool 8. This focusing may be approximate, since it is unnecessary for the beam to be accurately focused on the score line to effect the required severance of the glass ribbon. Tests showed that 1 millimeter of glass thickness was cut at a relative speed of 95 mm per second, i.e., approaching 6000 mm per minute, between the focused beam and the glass. These results were obtained with power reduced by at least 50% in comparison with the power required when using the known laser beam cutting technique.

FIG. 3 shows an apparatus in which a glass ribbon 14 is severed longitudinally at its edges while in longitudinal movement on a roller conveyor 15. The glass ribbon may for example be severed while travelling away from an annealing lehr after being formed by a conventional drawing process, or by flotation of glass on a bath of molten metal. A fixed bar or arm 16 is disposed above, and transversely of the direction of continuous forward movement of the glass ribbon, this direction being indicated by an arrow. Two scoring tool carriers 17 and 18 are mounted on this transverse arm. The scoring tools may be of diamond wheel type. The apparatus is designed to sever the edges of a glass ribbon which as a rule are subject to considerable irregularities of thickness either in relation to the remainder of the ribbon, or from one place to another along such edges. The tools progressively score along the margins of the glass ribbon as it advances beneath the tools, which are fixed. Immediately behind the tool-carriers 17, 18, there are optical devices 19, 20 for focusing laser beams on the freshly scored lines. The laser beams are emitted horizontally from laser sources 21, 22 disposed above the marginal zones of the ribbon 14 and are deflected through 90° by reflecting devices (not shown).

The marginal portions 23, 24 of the ribbon 14, which are severed from the main part thereof, are supported by rollers 25 – 28 which are so disposed and rotated that they move such marginal portions away from the main part of the ribbon.

In a number of tests use was made of two laser beams of different wavelengths for severing the glass along the or each scored line, for instance a $CO_2$ laser with a radiation wavelength of 10.6 microns and a $H_2O$ laser with a wavelength of 22 microns. The double beam facilitated the severance of the glass with good quality separated edges notwithstanding significant variation in the glass thickness along the line or lines of severance. Severing operations employing two laser beams can be performed with the apparatus shown in FIGS. 1 and 2 by the use of a second laser source 9' producing a laser beam having a wavelength $\lambda_2$ different from the wavelength, $\lambda_1$, of the beam produced by laser 9. Laser 9' is oriented to direct its beam toward mirror 11 in such a manner that the two laser beams will irradiate the same line along the surface of ribbon 1.

It will be understood that the above description of the present invention is susceptible to various modifications, changes and adaptations, and the same are intended to be comprehended within the meaning and range of equivalents of the appended claims.

We claim:

1. In a method of severing vitreous or vitrocrystalline sheet material along a predetermined line by inducing severing forces of thermal origin in the sheet material by irradiating it with at least one laser beam, the improvement comprising, before such irradiation of the material, scoring the material along substantially the entire length of said predetermined line, and subsequently effecting such irradiation by irradiating the material along such predetermined line with at least two laser beams of different radiation wavelengths such that the material to be severed has different degrees of transparency with respect to the different beams.

2. A method according to claim 1 wherein a relative movement is produced between such laser beam and the sheet material to cause the material to be progressively irradiated by such beam along the line of severance.

3. A method according to claim 2 wherein said step of scoring is carried out by causing the sheet material to be traversed along the line of severance by a tool which scores the material along one portion of the predetermined line simultaneously with traversal of an adjacent portion of such line by the laser beam.

4. A method according to claim 1 wherein the sheet material is in continuous movement during said scoring and during the laser beam irradiation thereof.

5. A method according to claim 1 wherein the sheet material is a continuous glass ribbon.

* * * * *